United States Patent Office 3,148,113
Patented Sept. 8, 1964

3,148,113
CONCURRENT ORAL ADMINISTRATION OF GLUCOSAMINE WITH A TETRACYCLINE ANTIBIOTIC FOR ENHANCED ANTIBIOTIC BLOOD LEVELS
Michael Carlozzi, Cranford, N.J., and William C. Gittinger, Flushing, N.Y., assignors to Chas. Pfizer & Co., Inc., New York, N.Y., a corporation of Delaware
No Drawing. Filed Apr. 28, 1958, Ser. No. 731,140
6 Claims. (Cl. 167—55)

This invention is concerned with novel compositions for use in the treatment of disease. It is also concerned with an improved method for inhibiting microorganisms which are of importance in causing disease.

In particular, the present invention is concerned with compositions of a tetracycline-type antibiotic and glucosamine, a salt or a derivative thereof. It is also concerned with the method of concurrently administering these two types of materials to animals. When reference is made herein to a tetracycline-type antibiotic, this is intended to include not only oxytetracycline, tetracycline, chlortetracycline, bromtetracycline, 6-demethylchlortetracycline, 6-demethyltetracycline, 6-deoxy-6-demethyltetracycline, in their amphoteric form and as salts with bases and acids, as complexes with polyvalent metal compounds but also as biologically active derivatives of these antibiotics such as esters.

The tetracycline-type antibiotics have proven highly effective in the treatment of a variety of diseases caused by Gram-positive and Gram-negative bacteria as well as other types of microorganisms. It has been found that when one of these antibiotics is administered to an animal, including humans, by the oral route, concurrently with glucosamine or a salt thereof, the antibiotic is even more effective than when administered alone. The increased effectiveness of the antibiotics is, of course, most useful for the treatment of various disease conditions. This increased effectiveness is evidenced by an increase in blood level of the antibiotic when the compositions containing the antibiotic and the glucosamine compound are administered orally or when these two materials are separately administered to the animal within a few hours of one another, that is, "concurrently administered."

The process of the present invention may be conducted with the use of more than one of the antibiotics, such as a mixture of oxytetracycline and tetracycline, or with more than one of the different forms of these antibiotics, such as the amphoteric form and the hydrochloride. In addition, glucosamine may be utilized in more than one of its forms. This is also true of the compositions which consist of at least one of the antibiotics and at least one form of glucosamine.

In general, at least about one-third part by weight of glucosamine in one of its various forms is used in conjunction (either as a composition or concurrently administered) with one part by weight of the antibiotic, the parts by weight of antibiotic being calculated on the basis of the content of amphoteric material present therein. There is no advantage in using more than about three parts by weight of glucosamine per part by weight of the antibiotic. In general, it is preferred to use approximately equal weights of the two materials. Species of animals and individuals within the various species vary to some extent in their response to the compositions and the process of the present invention. However, in general, there is a definite and valuable response to these compositions and processes.

A variety of salts of glucosamine may be used. These are formed from the base and a non-toxic acid, either organic or inorganic, e.g. phosphoric, sulfuric, hydrochloric, hydrobromic, citric, tartaric, succinic, salicylic, etc.

It has been found, as an example of the present valuable invention, that orally administering 250 milligrams of oxytetracycline as the hydrochloride in conjunction with twice the weight of glucosamine hydrochloride to a group of 30 human patients resulted in substantially higher oxytetracycline blood levels than when administered alone over a period of more than six hours after administration. In the following table this information is summarized together with the blood levels obtained in a like group of human patients to whom 250 milligrams of oxytetracycline as the hydrochloride alone was administered. The drugs were administered orally just after a meal.

|  | Average Blood Level | | |
|---|---|---|---|
|  | 2 hours | 3 hours | 6 hours |
| Oxytetracycline Hydrochloride | 0.327 | 0.620 | 0.356 |
| Oxytetracycline Hydrochloride + Glucosamine Hydrochloride | 0.676 | 0.955 | 0.521 |

It is apparent from this tabulation that there is a definite increase in the effective blood level of the antibiotic due to the coadministration of glucosamine hydrochloride. This is particularly true in the first few hours after administration when it is so desirable to have maximum blood level to combat an acute infection.

In the following table are summarized the similar results obtained upon comparison of the blood level obtained with oral administration of tetracycline hydrochloride to human patients as compared to the administration of tetracycline hydrochloride and twice its weight of glucosamine. In each case 250 milligrams of the antibiotic was administered. The first group of 15 patients were treated in the morning prior to ingestion of any food. The second group was treated after breakfast.

|  | Average Blood Level | | |
|---|---|---|---|
|  | 2 hours | 3 hours | 6 hours |
| Fasting: | | | |
| Tetracycline Hydrochloride | 1.422 | 1.609 | 1.088 |
| Tetracycline Hydrochloride + Glucosamine | 1.429 | 1.886 | 1.416 |
| Non-Fasting: | | | |
| Tetracycline Hydrochloride | 0.690 | 0.703 | 0.690 |
| Tetracycline Hydrochloride Glucosamine | 0.825 | 0.809 | 0.738 |

This is a continuation-in-part of patent application Serial No. 688,116, filed on October 4, 1957, by Michael Carlozzi et al., now abandoned.

The following example is given to illustrate the present invention and is not to be considered as limiting the same.

*Example I*

A mixture was prepared by blending together dry oxytetracycline hydrochloride weighing 100 grams and 200 grams of dry glucosamine. The mixture was thoroughly blended. A series of 15 subjects were treated by the oral administration of a capsule containing 250 milligrams of oxytetracycline hydrochloride. A second group of patients of the same number was treated with capsules containing 250 milligrams of oxytetracycline hydrochloride and 500 milligrams of glucosamine. Those treated with the combination of antibiotic and glucosamine showed a blood level appreciably higher than those treated with the antibiotic alone. The increase in blood level was more marked with the patients that were treated before receiving any food in the morning.

Detailed reports of the effectiveness of glucosamine in enhancing the effectiveness of the broad-spectrum antibiotics have been published in Antibiotic Medicine and Clinical Therapy, vol. V, No. 2, February 1958, pp. 146–151, and vol. V. No. 1, January 1958, pp. 52–58.

What is claimed is:

1. A method for treating disease by enhancing the blood levels of a tetracycline antibiotic which comprises orally administering to the infected animal at least one tetracycline antibiotic concurrently with a compound chosen from the group consisting of glucosamine and a salt of a glucosamine with a non-toxic acid.

2. A method as claimed in claim 1 wherein the infected animal is treated concurrently with a tetracycline antibiotic and a salt of a glucosamine with a non-toxic acid.

3. A method as claimed in claim 1 wherein the infected animal is treated with a mixture of a tetracycline antibiotic and glucosamine.

4. A method as claimed in claim 1 wherein the infected animal is treated with a mixture of tetracycline hydrochloride and glucosamine hydrochloride.

5. A tetracycline antibiotic composition for oral administration having enhanced antibiotic blood level properties comprising at least one tetracycline antibiotic and at least one compound chosen from the group consisting of glucosamine and a salt of glucosamine with a non-toxic acid in the proportions of at least one-third part by weight of said compound per part by weight of said tetracycline antibiotic.

6. A composition of claim 5 wherein the tetracycline antibiotic is tetracycline hydrochloride and the compound is glucosamine.

References Cited in the file of this patent

UNITED STATES PATENTS

| | | |
|---|---|---|
| 2,832,766 | Wolfram | Apr. 29, 1958 |
| 2,871,160 | Johnson et al. | Jan. 27, 1959 |
| 2,907,697 | Costello et al. | Oct. 6, 1959 |
| 2,980,584 | Hammer | Apr. 18, 1961 |
| 3,008,874 | Feeney et al. | Nov. 14, 1961 |

OTHER REFERENCES

AM and CT, vol. 5, No. 6, June 1958, pp. 359–363.

Kent et al.: "Bio Chemistry of the Amino Sugars," Academic Press, Inc., New York (1955), pages 1–8, 26–40, 249–265.

Boger et al.: The New England Journal of Medicine, vol. 261, No. 17, October 22, 1959, pages 827–832.

Lacassagne et al.: "Some New Experiments on Protection Against Whole-Body Irradiation," J. Nat. Cancer Inst., vol. 15 (4), pp. 915–921 (1955).

Watkins et al.: "Role of a D-Glucosamine as Inhibitor of the Precipitation of Blood Group Substances by Anti-Type XIV Pneumococcus Serum," Nature, vol. 178, No. 4545, pp. 1289–1290, Dec. 8, 1956.

Trolle-Lassen et al.: "Om HoldBarheden Af Antibiotika I Oplosninger Indeholdende Diodon Som Salt Af Forskellige Aminer," Archiv. for Pharmaci og. Chemi (Denmark) 62 Bind, 112 Argang, Nr. 15, pages 577–583, July 23, 1955.

Reed: "Effect of Cortisone on the Positive Potentials Induced by Glucosamine and Amino Purines in the Synovial Cavities of Dogs," Am. J. Physiol., vol. 168, pp. 820–824 (1952).

Quastel et al.: "Inhibition of Tumour Growth by D-Glucosamine," Nature, vol. 171, No. 4345, pages 252–253, Feb. 7, 1953.

Rubin et al.: "The Effect of D-Glucosamine Hydrochloride and Related Compounds on Tissue Cultures of the Solid Form of Mouse Sarcoma 37," Cancer Research, vol. 14, No. 6, pp. 456–458, 1954.

Paschoud: "Experimentelle Untersuchungen Zur Haparin-Genese Der Urticaria Pigmentosa," Dermatologica (Basel), vol. 108 (4–6), pp. 361–365 (1954).

Duplan et al.: "Action Preservatrice De La Glucosamine Vis-A-Vis De l'Action Letale E'Une Irradiation Totale Par Rayons X Chez La Souris," Comptes Rendus Acad. Sci. France, vol. 239 (1), pp. 116–117, July 5, 1954.